US012337455B2

(12) United States Patent
Bobowicz et al.

(10) Patent No.: US 12,337,455 B2
(45) Date of Patent: Jun. 24, 2025

(54) HYDRAULICALLY ACTUATABLE WORK DEVICE DESIGNED TO BE HANDHELD

(71) Applicant: GUSTAV KLAUKE GMBH, Remscheid (DE)

(72) Inventors: Roman Bobowicz, Remscheid (DE); Egbert Frenken, Heinsberg (DE)

(73) Assignee: GUSTAV KLAUKE GMBH, Remscheid (DE)

( * ) Notice: Subject to any disclaimer, the term of this patent is extended or adjusted under 35 U.S.C. 154(b) by 0 days.

(21) Appl. No.: 18/031,312

(22) PCT Filed: Oct. 11, 2021

(86) PCT No.: PCT/EP2021/078016

§ 371 (c)(1),
(2) Date: Apr. 11, 2023

(87) PCT Pub. No.: WO2022/078944

PCT Pub. Date: Apr. 21, 2022

(65) Prior Publication Data

US 2023/0398675 A1 Dec. 14, 2023

(30) Foreign Application Priority Data

Oct. 12, 2020 (DE) .......................... 102020126637.5
Nov. 24, 2020 (DE) .......................... 102020131036.6

(51) Int. Cl.
*B25F 5/00* (2006.01)
*H01R 43/048* (2006.01)

(52) U.S. Cl.
CPC ............ *B25F 5/005* (2013.01); *H01R 43/048* (2013.01)

(58) Field of Classification Search
CPC ... B25F 5/005; H01R 43/048; H01R 43/0427; B25B 27/10; B25B 27/146; F15B 15/1409
(Continued)

(56) References Cited

U.S. PATENT DOCUMENTS 2,722,859 A * 11/1955 Stoltz .................... H01R 43/045 81/418
2,863,346 A * 12/1958 Klingler ............. H01R 43/0427 174/94 R (Continued)

FOREIGN PATENT DOCUMENTS

CA 2944777 C * 8/2022 ........... B25B 27/146
DE 102016116878 A1 * 3/2018

(Continued)

OTHER PUBLICATIONS

International Search Report for PCT/EP2021/078016 mailed dated Feb. 3, 2022, 4 pages.

*Primary Examiner* — Robert F Long
(74) *Attorney, Agent, or Firm* — Klintworth & Rozenblat LLP

(57) ABSTRACT

A hydraulically activatable working device includes a hydraulic cylinder and at least one first and one second partial piston provided therein. The partial pistons can be moved under pressurization by a hydraulic medium to perform a working operation. Each partial piston has an impact surface at its lower end against which the hydraulic medium may act. A piston rod is coupled to the hydraulic cylinder and has an impact surface at its lower end against which the partial pistons may act. The impact surface forms a first partial impact surface against which the first partial piston acts, and forms a second partial impact surface against which the second partial piston acts. The first and
(Continued)

second partial impact surfaces do not overlap each other in direction across to the traversing direction.

21 Claims, 6 Drawing Sheets

(58) Field of Classification Search
USPC ..... 173/1–2, 13, 18–20, 184, 29–31, 38–39, 173/45–53, 197, 81, 90, 140–141, 162.1, 173/198, 213, 168–171
See application file for complete search history.

(56) References Cited

U.S. PATENT DOCUMENTS

| | | | | |
|---|---|---|---|---|
| 2,897,703 | A * | 8/1959 | Fischer | H01R 43/0427 72/445 |
| 2,968,202 | A | 1/1961 | Evans et al. | |
| 3,099,837 | A * | 8/1963 | Heilman | B25C 1/005 227/112 |
| 3,154,981 | A | 11/1964 | McDurmont | |
| 3,313,213 | A * | 4/1967 | Wandel | B25C 1/041 91/422 |
| 3,363,517 | A * | 1/1968 | Powers | B25C 1/041 91/416 |
| 3,396,636 | A * | 8/1968 | Heinz | B25C 1/041 91/461 |
| 3,772,493 | A * | 11/1973 | Iten | B23H 7/30 219/69.16 |
| 4,129,240 | A * | 12/1978 | Geist | B25C 1/06 227/8 |
| 4,197,974 | A * | 4/1980 | Morton | B25C 1/04 227/8 |
| 4,323,127 | A * | 4/1982 | Cunningham | B25C 1/06 124/78 |
| 4,495,855 | A * | 1/1985 | Murakami | F01B 3/02 417/269 |
| 4,521,963 | A * | 6/1985 | Lind | H01R 43/0427 137/635 |
| 4,561,248 | A * | 12/1985 | Quin | F16F 15/027 91/170 R |
| 4,951,757 | A * | 8/1990 | Hamada | B25D 9/12 91/277 |
| 5,181,450 | A * | 1/1993 | Monacelli | F15B 15/261 173/127 |
| 5,322,136 | A * | 6/1994 | Bui | E21B 4/14 173/110 |
| 5,342,178 | A * | 8/1994 | Kimura | F04B 27/1018 417/500 |
| 5,440,878 | A * | 8/1995 | Gleasman | F01B 3/02 91/506 |
| 5,477,680 | A * | 12/1995 | Heskey | F04B 49/128 173/148 |
| 5,664,634 | A * | 9/1997 | McCracken | B24B 23/00 173/205 |
| 5,712,543 | A * | 1/1998 | Sjostrom | B25F 3/00 318/67 |
| 5,725,058 | A * | 3/1998 | Eriksson | B23D 51/16 30/392 |
| RE36,166 | E * | 3/1999 | Johns | E21B 4/16 173/17 |
| 6,082,536 | A * | 7/2000 | Ito | B25C 1/005 411/442 |
| 6,532,790 | B2 * | 3/2003 | Frenken | B25B 27/10 81/421 |
| 7,254,982 | B2 * | 8/2007 | Frenken | B25B 27/10 72/407 |
| 7,412,868 | B2 * | 8/2008 | Frenken | B25B 27/10 72/407 |
| 7,578,161 | B1 * | 8/2009 | Sizemore | B21D 41/021 72/370.11 |
| 9,662,777 | B2 * | 5/2017 | Pomeroy | B25C 1/041 |
| 10,468,847 | B2 * | 11/2019 | Frenken | H01R 43/048 |
| 11,919,131 | B2 * | 3/2024 | Frenken | H02G 1/005 |
| 2005/0279802 | A1 * | 12/2005 | Moeller | B25C 1/08 227/130 |
| 2006/0016845 | A1 * | 1/2006 | Ishizawa | B25C 1/042 227/130 |
| 2006/0137946 | A1 * | 6/2006 | Stow | F15B 15/1457 188/297 |
| 2007/0251710 | A1 * | 11/2007 | Lim | E21B 4/14 173/109 |
| 2009/0272782 | A1 * | 11/2009 | Johnson | B25B 21/00 227/130 |
| 2010/0107905 | A1 * | 5/2010 | Stull | H01R 43/0427 100/269.14 |
| 2010/0170931 | A1 * | 7/2010 | Viola | A61B 17/068 227/175.1 |
| 2010/0224356 | A1 * | 9/2010 | Moore | E21B 17/0283 166/65.1 |
| 2011/0036609 | A1 * | 2/2011 | Blickle | B24B 23/028 173/213 |
| 2011/0198381 | A1 * | 8/2011 | McCardle | B25C 1/06 227/8 |
| 2012/0118597 | A1 * | 5/2012 | Hauptmann | B25D 17/06 173/126 |
| 2012/0153003 | A1 * | 6/2012 | Dittrich | B25F 5/00 173/1 |
| 2013/0161043 | A1 * | 6/2013 | Blum | B25D 16/006 173/48 |
| 2013/0264085 | A1 * | 10/2013 | Ciotti | B25F 5/005 173/29 |
| 2014/0082949 | A1 * | 3/2014 | Kocsis | B23D 51/16 30/392 |
| 2014/0182872 | A1 * | 7/2014 | Rubens | B24B 23/04 173/213 |
| 2014/0262406 | A1 * | 9/2014 | Moore | B25D 9/20 173/208 |
| 2015/0283693 | A1 * | 10/2015 | Chiasson | B25F 5/005 173/168 |
| 2015/0364889 | A1 * | 12/2015 | Frenken | H01R 43/0427 29/862 |
| 2016/0368128 | A1 * | 12/2016 | Uchiyama | F16K 17/048 |
| 2017/0001291 | A1 * | 1/2017 | Schnell | B25C 1/00 |
| 2017/0036327 | A1 * | 2/2017 | Murakami | B25F 5/006 |
| 2017/0087703 | A1 * | 3/2017 | Moore | B25D 17/00 |
| 2018/0163366 | A1 * | 6/2018 | Park | E02F 3/966 |
| 2018/0318901 | A1 * | 11/2018 | Vulcan | B21J 13/14 |
| 2018/0326600 | A1 * | 11/2018 | Wason | B26B 15/00 |
| 2019/0381643 | A1 * | 12/2019 | Fan | B25C 1/08 |
| 2020/0006907 | A1 * | 1/2020 | Torrey | A01G 3/02 |
| 2020/0180049 | A1 * | 6/2020 | Frenken | B23D 29/00 |
| 2020/0215672 | A1 * | 7/2020 | Pomeroy | B25C 1/047 |
| 2021/0086335 | A1 * | 3/2021 | Bider | B25B 27/146 |
| 2022/0063074 | A1 * | 3/2022 | Wierzchon | B25C 1/048 |
| 2022/0176532 | A1 * | 6/2022 | Nakajima | B25C 7/00 |
| 2023/0120099 | A1 * | 4/2023 | LeFavour, Jr. | B25B 27/146 173/216 |
| 2023/0122029 | A1 * | 4/2023 | Bierdeman | B25C 1/047 227/130 |
| 2023/0275382 | A1 * | 8/2023 | Frenken | H01R 43/0428 29/592 |
| 2024/0009816 | A1 * | 1/2024 | Frenken | B25B 27/146 |
| 2024/0051108 | A1 * | 2/2024 | Kamijo | F04B 53/16 |
| 2024/0165784 | A1 * | 5/2024 | Lefavour | B25F 5/005 |

FOREIGN PATENT DOCUMENTS

| | | | | |
|---|---|---|---|---|
| DE | 102019113358 | A1 * | 11/2020 | F15B 11/036 |
| EP | 1176308 | B1 * | 5/2006 | B25B 27/10 |
| EP | 3088134 | A2 * | 11/2016 | B21F 15/00 |
| FR | 2759122 | A1 * | 8/1998 | F15B 15/1409 |
| NL | 2010256 | C2 * | 8/2014 | |
| TW | 451030 | B * | 8/2001 | |
| WO | WO2014108361 | A1 | 7/2014 | |
| WO | WO2019016194 | A2 | 1/2019 | |
| WO | WO-2021069587 | A1 * | 4/2021 | B21D 39/048 |

* cited by examiner

HYDRAULICALLY ACTUATABLE WORK DEVICE DESIGNED TO BE HANDHELD

AREA OF TECHNOLOGY

The invention relates to a hydraulically activatable working device designed for performing a working an operation, with a hydraulic cylinder and at least one first and one second partial piston provided for in the hydraulic cylinder, wherein the partial pistons can be moved under pressurization by a hydraulic medium in a traversing direction in the hydraulic cylinder for performing the working operation, wherein each partial piston has an impact surface at its lower end against which the hydraulic medium may act, wherein the partial pistons are acted on over the whole working operation at its impact surfaces with the respectively same hydraulic pressure, wherein further a piston rod is provided, which is coupled to the hydraulic cylinder, wherein the piston rod at its lower end has an impact surface against which the partial pistons may act, wherein further the piston rod is provided for separately to the partial pistons and only on by one partial piston or by several or all partial pistons at the same time, wherein further within the hydraulic cylinder a return spring is provided for, wherein the partial pistons are moveable in the traversing direction within the hydraulic cylinder under the pressure of the hydraulic medium against the force of the return spring, wherein further a tool is provided for, which is coupled to the piston rod and moveable therewith and wherein the partial pistons are provided for acting on the same tool.

PRIOR ART

Such a hydraulically activatable working device, being designed as a hand tool, which is also preferred within the framework of the invention, is already known from WO 2014/108361 A1 or US 2015/0364889 A1 (U.S. Pat. No. 10,468,847 B2).

In the known hand tool, a second partial piston arranged inside of a first partial piston with respect to its impact surface acts on the piston rod inside of the hydraulic cylinder. Meanwhile, the first partial piston penetrates the hydraulic cylinder, and acts on the piston rod outside of the hydraulic cylinder, allocated to an end area of the piston rod. Certain limitations are associated with this. One disadvantage involves disassembly, for example for maintenance purposes. The first partial piston provided is also to be relatively large. In addition, a first return spring supported in the hydraulic cylinder only acts on the first partial piston, with the second partial piston being exposed to a second return spring that acts between the first partial piston and the piston rod. After pressing has been completed, when hydraulic fluid again runs out of the hydraulic cylinder, the first partial piston is always retracted, in any event as a priority, which in practice causes the partial piston, in any event the first partial piston, to retract almost completely, in terms of inserting a new workpiece, even if it only has the dimensions of the workpiece pressed beforehand.

Known from U.S. Pat. No. 2,968,202 A is a hydraulically activatable hand tool that likewise has a first and a second partial piston. However, the second partial piston is only exposed to a hydraulic pressure if the first partial piston has driven against a stop, i.e., a first portion of the operation has already concluded. The partial pistons also act upon various piston rods.

From U.S. Pat. No. 2,863,346 A pressing tool is known with two partial pistons being arranged one above the others and which have each an own piston rod. The second partial piston cans only an effect once a certain hydraulic pressure acting on the first partial piston is exceeded.

From FR 2 759 122 A1 hydraulically piston/cylinder arrangement is known with two hydraulic pistons which do allow an initially great power and thereupon a comparatively great velocity concerning the moving part. The piston rods of the pistons are in each case only impactable by the respective piston. The impact of the piston rod of the second, upper piston is given assigned to an upper end of the piston rod.

SUMMARY OF THE INVENTION

The invention as well as hydraulically activatable hand tools known in prior art make it possible to execute a multistage pressing operation.

Starting from the prior art as described, as to which is be referenced to WO 2014/108361 A1 (US 2015/0366489 A1) the invention is to indicate a hydraulically activatable working device that allows an effective and advantageous multistage pressing given a simple configuration.

This object is achieved by the subject matter of claim 1, with the emphasis being placed on the impact surface forms the first partial impact surface against which the first partial piston is provided for to act, and forms the second partial impact surface against which the second partial piston is provided for to act, wherein the first and second partial impact surfaces do not overlap each other in direction across to the traversing direction.

The piston rod can have a comparatively simple configuration. Only an overall impact surface is required, which has all partial impact surfaces, without having to consider a mutual overlapping of partial impact surfaces in relation to the mentioned projection.

An advantageous further development provides that all partial impact surfaces be located inside of the hydraulic cylinder over the entire operation. This also makes it easier to guide the piston rod through a cylinder cover. Only the piston rod as such must be guided through the cylinder cover. The piston rod is coupled with the hydraulic cylinder such that the piston rod does extend in view of its impact surface and an essential part of its length within the hydraulic cylinder, with a further, preferably one part provided for part, which does also have the working part, outside to the hydraulic cylinder. There is a preferably sealed passing through of the piston rod through the sealing of the cylinder of the hydraulic piston.

The piston rod can be impacted by all partial pistons simultaneously, in particular at the beginning of an operation. However, it can also be acted upon during the operation by a partial piston or possibly a pair of partial pistons, or by an allocated plurality of pistons, as has yet to be explained in more detail further below.

The partial pistons are each acted upon with hydraulic pressure by the hydraulic fluid. For this purpose, a first partial piston has a first impact surface, and each additional partial piston has an additional impact surface.

The impact surfaces are to be understood as the respective hydraulically effective surface in a projection on a plane transverse to the traversing direction.

A second, possibly further, and preferably each additional impact surface can be arranged inside of the first impact surface.

In the mentioned projection, the first, second and the additional impact surfaces can coincide with transfer surfaces formed opposite each other on the respective partial piston for transferring force to the partial transfer surfaces. This also allows the transfer surfaces to be arranged inside of each other. In particular with regard to the configuration with a stop flange yet to be described further below, a surface that comprises the impact surface can overlap an enveloping surface of an additional partial piston. As a rule, this part is then a hydraulically ineffective part of the impact surface if the overlapped surface area is hydraulically effective. An outer edge of an impact surface is to be understood in relation to the hydraulically effective edge of the surface that comprises the impact surface.

With respect to the partial pistons, one or several return springs can be provided. Only one return spring is preferably provided. The partial pistons overall, meaning all partial pistons, can then be reset by the same return spring. This in particular also advantageously makes it possible to easily interrupt a retraction of the piston rod, and initiate an ensuing pressing operation proceeding from such a not fully retracted position.

It is further preferred that the return spring act directly only between the hydraulic cylinder and the piston rod. In this regard, several or all partial pistons are preferably only acted upon indirectly by means of the piston rod.

The piston rod can have an impact flange for the return springs. One of the partial pistons, preferably the first partial piston, can further have a sleeve part. The sleeve part can extend on the partial piston in the direction toward the cylinder cover, while facing the piston rod. The impact flange of the piston rod can be arranged inside of the sleeve part. In this embodiment, at least one part of the return spring is simultaneously accommodated inside of the sleeve part.

The first partial piston is preferably designed with a first gasket, with which it is sealed against an inner surface of the hydraulic cylinder. In this regard, the first partial piston is understood as the partial piston that is in direct contact with the inner surface of the hydraulic cylinder, possibly as the only one of the partial pistons. The first partial piston can further be designed with a second gasket, with which it is sealed relative to an outer surface of an additional partial piston. In this regard, it can also have several second gaskets for several additional partial pistons.

Because the first partial piston has the mentioned gaskets for the one or the several partial pistons, the second or the additional partial pistons can even be designed without their own gasket. If the partial pistons are only provided in a concentric arrangement relative to each other, only the centrally innermost partial piston is preferably designed without its own gasket.

Each partial piston has a geometric central axis that extends in the traversing direction. The geometric central axis is preferably the axis that intersects a surface midpoint of the partial piston relative to the surface given by its outer edge in the sense of the impact surface, but in this conjunction without considering an impact surface of an additional partial piston that might be located inside of the impact surface.

In a first embodiment, the partial pistons can now be arranged in such a way that the geometric central axes converge. It is here preferred that several partial pistons be designed so as to telescope into each other. This can initially be the first partial piston and the second partial piston. However, more than two partial pistons can also be involved, which are arranged so as to telescope into each other in this way inside of the first partial piston.

An alternative embodiment, but one that can be provided supplementarily to the embodiment described above, provides that partial pistons be realized with geometric central axes running spaced apart relative to each other. Partial pistons arranged next to each other in the mentioned projection can here be involved. Each of the several additional partial pistons can here only be arranged in a through opening of the first partial piston allocated to only one of these respective additional partial pistons.

With regard to these partial pistons arranged eccentrically relative to a central axis of the hydraulic cylinder, it can further be provided that two identical partial pistons be arranged opposite each other relative to the mentioned central axis, which travel the same distance even during an operation, possibly beyond the first partial piston. This makes it possible to nevertheless achieve an essentially balanced load on the piston rod. As an alternative to the identical partial pistons lying opposite each other relative to the central axes, an arrangement at identical peripheral distances relative to the central axes can also be provided given more than two insofar identical partial pistons.

The first and one second and beyond that possibly additional partial pistons can be located only inside of the hydraulic cylinder during an entire operation. The first partial piston can be designed as a ring piston, and the second piston as a piston that extends inside of the first partial piston, for example with a circular layout. In like manner, the second partial piston can also be designed as a ring piston, and an additional partial piston with a circular layout with respect to its impact surface. In particular in the traversing direction, the partial pistons can be given a comparatively small or short design. Only the piston rod need be provided so as to be extendible from the hydraulic cylinder. The piston rod can be designed with just one overall impact surface, which can be composed of the several partial impact surfaces. Upon completion of a pressing operation, a retraction of the piston rod can be halted at practically any point desired to press a next workpiece. The next pressing operation can be performed immediately from this position of the piston rod.

The piston rod can have a traversing area between an initial position and a final position. In the traversing area of the piston rod, a change can arise from all partial pistons acting on the piston rod, in particular at the beginning of an operation, to a portion of the partial pistons, or ultimately just one partial piston, doing so in particular at the end of the traversing area.

The piston rod has an overall impact surface that is located inside of the hydraulic cylinder over the entire traversing area. This overall impact surface or the partial impact surfaces that comprise the overall impact surface is/are acted upon alternately or simultaneously by the partial pistons.

The piston rod that can be separated from both the first and a second and possibly additional partial pistons can have an integral design. This piston rod can also be designed with only one all-around impact flange for a return spring. It can loosely lie on the transfer surfaces of the partial pistons.

The overall impact surface of the piston rod is preferably uniformly flat throughout, with an essentially rectangular extension to the traversing direction of the piston rod during an operation. Nevertheless, a distinction can be made between two or more partial impact surfaces, wherein a first partial impact surface is only acted upon by the first partial piston, a second partial impact surface only by the second partial piston, etc. during an operation.

Only one return spring is advantageously provided in all. This one return spring can simultaneously bring about a retraction of the piston rod as well as the first and the second, etc., partial piston.

A return spring, or the return springs, advantageously act(s) directly upon the piston rod, possibly on the impact flange of the piston rod, and by contrast only indirectly upon the partial pistons. The partial pistons are indirectly acted upon via the overall impact surface of the piston rod.

The piston rod with the return spring can also be arranged in a replacement head of the working device, and be removable out of the hydraulic cylinder or from the hydraulic cylinder together with the replacement head, wherein the first, the second, etc., partial piston can remain in the hydraulic cylinder. As a consequence, the “wet side”, meaning the partial pistons whose impact surfaces can be acted upon with hydraulic fluid, do not have to be removed when changing out the tool head. The work can advantageously be done on the “dry side”. Accordingly, the replacement head can have the cylinder cover and a partial cylinder wall extending from the cylinder cover in the direction toward a cylinder floor.

It is further preferred that the impact flange of the piston rod, if provided, be arranged inside of a sleeve section of a partial piston, preferably of the first partial piston. The first partial piston can be driven against a stop by means of the neck section, wherein after a stop has been made, just the additional partial piston(s), at least a second partial piston, is/are now moved by increasing the pressure in the hydraulic fluid. The second, etc., partial piston then continues to advance further in the traversing direction relative to the impact surface of the first piston rod, i.e., in the direction of the piston rod. The second, etc., piston rod here continues to abut the allocated partial impact surface of the piston rod, but with the latter otherwise being lifted from the allocated transfer surface of the first partial piston. In the event of several identical partial pistons, the latter simultaneously abut the respectively allocated partial impact surface of the piston rod, which then is also otherwise lifted from the allocated transfer surface (at least) of the first partial piston.

The preferably single return spring preferably envelops the piston rod in an annular space between the mentioned sleeve part and an outer surface of the piston rod. This annular space is preferably downwardly limited by the impact flange of the piston rod. It is preferable, and at least effective, that the annular space be limited by the cylinder cover of the hydraulic cylinder toward the top, or in an extending direction. As already mentioned, this cylinder cover can in a practical embodiment also be comprised of a corresponding area of the replacement head, for example. Accordingly, the return spring preferably acts between a part of a working head further preferably designed as a removable part, advantageously a replacement head, and an upper side of the impact flange of the piston rod.

The second, etc., partial piston is further preferably sealed and guided inside of the first partial piston. The second, etc., partial piston here preferably has a stop flange, with which it abuts an inwardly facing, preferably continuous, projection of the first partial piston in the widest possible extended position relative to the first partial piston. The seal is formed preferably outside of the stop flange in a traversing direction offset in the direction toward the cylinder cover. As a rule, the stop flange does not form a hydraulically effective area of the surface that forms the respective impact surface. However, a gasket inside of the stop flange, i.e., in a radial area of the stop flange, can on the other hand necessitate including the surface portion of the stop flange in the hydraulically effective impact surface. The second, etc., partial piston can thus not be removed toward the outside relative to the first partial piston. In order to take the second partial piston out of the hydraulic cylinder, the first partial piston must rather first be removed from the hydraulic cylinder, after which the second partial piston must be pulled downwardly, so to speak, out of the first partial piston.

The first partial piston is preferably designed with a first gasket, which seals it relative to an inner surface of the hydraulic cylinder, and simultaneously also with a second, possibly additional second gasket(s), which seals it relative to an outer surface of the second and possibly additional partial piston.

The second partial piston can thus in itself preferably be designed without a gasket. It does not have to have a recess for receiving a sealing ring or the like.

The partial piston, possibly both or all partial pistons, are preferably telescoped into each other according to a first possible embodiment in this regard. A partial piston that is arranged inside of the first partial piston and telescopically receives an additional partial piston preferably has a gasket with which it interacts with this additional partial piston.

Accordingly, the second, etc., partial piston is preferably only allocated to one inner area relative to the first or a second partial piston in this embodiment. The impact surface of the first partial piston for exposure to pressure by the hydraulic fluid is designed so as to annularly envelop the impact surface of the second partial piston. The impact surface of the first partial piston is correspondingly preferably designed like a circular ring. The impact surface of the second or possibly inner partial piston is preferably designed as a circular area.

A movement characteristic of the partial pistons is primarily not dependent on the behavior of their surfaces. The surface ratio provided can basically be such that the first partial piston acts on the piston rod with a greater force than the second or any additional partial piston when an operation begins. A sequential force applied by the partial pistons on the piston rod is preferably also connected with a gradual decline in the force exerted on the piston shaft. However, both partial pistons, or several partial pistons, simultaneously act upon the piston rod at the beginning of an operation until the first partial piston has driven against the stop.

At the beginning of an operation, the impact surfaces of the partial pistons are adjacent to or near a floor of the hydraulic cylinder. If hydraulic fluid is now pumped into the hydraulic cylinder on the floor side at a progressively rising hydraulic pressure, the partial pistons initially preferably act together on the overall impact surface of the piston rod, independently of their surface configuration with respect to the transfer surfaces. During an increase in pressure, however, it can be provided that the first partial piston arrive at the mentioned stop after a specific exit path, so that only the or the additional partial pistons still act upon the piston rod given a further increase in the hydraulic pressure. Even with respect to the additional partial pistons, a respective stop can then be provided, so that the next partial piston also withdraws from acting on the piston rod given several additional partial pistons. The impact surface of the piston rod is here simultaneously increasingly removed from the or the partial pistons that arrived at the stop, accompanied by a further compression of the return spring. The size of the impact surface of the second or the additional partial pistons makes it possible in particular to determine the force that comes to act upon the piston rod, and hence upon a tool exposed to the action of the piston rod, when the or the additional partial pistons alone transfer the force.

Connected with this is that tools that can be moved toward each other, or a tool and a stop in a tool head, can be moved toward each other over a first traversing path with an increasing force when the piston rod is acted upon by both or all partial pistons. The mentioned areas are then only exposed to the force of the second or the additional partial piston over an additional traversing path. This second, possibly third, etc., force can preferably be smaller than the respective first, second, etc., force.

The more than two partial pistons can be telescoped into each other in the same way as the first and the second partial piston, each with coincident central axes.

However, a first and a second and possibly additional partial pistons can also be arranged offset to each other with respect to their central axes. This in particular when a second and additional partial piston are guided in one or several openings eccentrically formed in the first partial piston. Advantageously provided here are a respective two or more identical partial pistons, i.e., partial pistons with the same length, in the traversing direction of the partial pistons, and preferably also with the same impact surface, so that a symmetrical application of force can thereby be achieved for the piston rod. Peripherally offset additional partial pistons with impact surfaces that deviate, but among themselves again coincide and preferably coincide, can then be provided, so that multiple stages exceeding two stages can also be achieved in this way.

A working device of the kind described here can be used to favorably process parts of varying size in the same working device, without there being too high an acting force given a smaller-sized part, for which a relevant force application often only takes place after the first partial piston has already driven onto a stop.

Such a working device can especially favorably be used for crimping purposes, for example for crimping wire end ferrules and/or cable shoes.

In the case of several identical partial pistons which, as described, are arranged one opposite the other or peripherally offset in relation to the central axis, the first partial piston preferably has several hole-like perforations, in which the rodlike, identical second and possibly third, etc., partial pistons sit. These rod-like partial pistons can then also be provided with varying lengths, wherein respectively allocated, identical partial pistons have a same length, so that the desired multistage system can hereby be achieved. Two rod-like partial pistons of identical length lying one opposite the other are preferably formed in relation to a midpoint or a central longitudinal axis of the hydraulic cylinder. The mentioned embodiments can also be combined with each other. In this case, for example, an embodiment with a first and second partial piston with a concentric arrangement, which is described here as a preferred embodiment, can be combined with rodlike, additional partial pistons in corresponding perforations of the first partial piston.

As known from the WO 2014/108361 A1 mentioned at the outset ox US 2015/0364889 A1, the working device described here can also be used for the preferably multistage pressing or crimping of cable shoes.

The working device can also be designed as a manual working device, for example as known from U.S. Pat. No. 3,154,981 A1.

The working device can also be designed as a working head separate from a hull unit, which is hooked up to the hull unit by means of a hydraulic hose. In this regard, for example, reference is made to the disclosure in WO 2019/016194 A2 (US 2020/0180049 A1), e.g., there specifically the illustration on FIG. 19.

BRIEF DESCRIPTION OF THE DRAWINGS

The invention will be explained in more detail below based on exemplary embodiments. Shown on.

DESCRIPTION OF THE EMBODIMENTS

Figure 4:
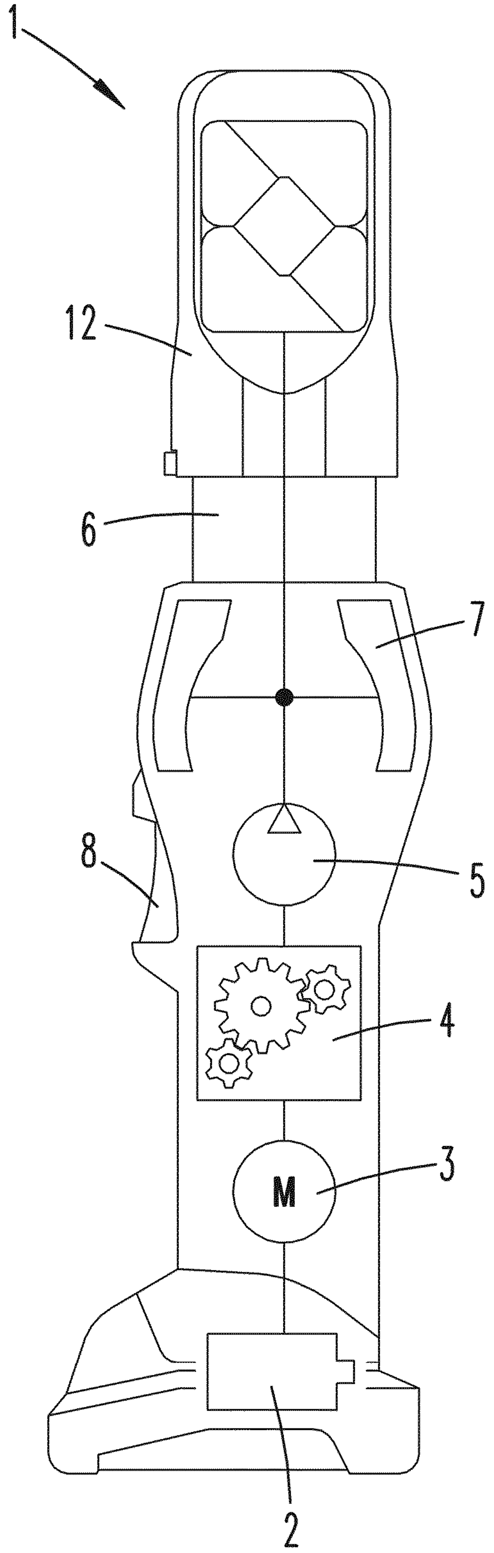
FIG. 4 is a schematic illustration of a working device as a whole.

Shown and described is a hydraulically activatable working device 1 designed as a hand tool. With reference to FIG. 4, the working device preferably has an accumulator 2, an electric motor 3, advantageously a gearbox 4 and a pump 5. The pump 5 can be used to pump hydraulic fluid into a hydraulic cylinder 6. The hydraulic fluid can run back into a storage space 7, and from there be pumped back into the hydraulic cylinder 6 again during an additional operation.

Given a preferably rodlike arrangement as depicted on FIG. 4, a gripping area can be provided that envelops the motor 3 and/or the gearbox 4 and/or the pump 5.

An activating switch 8 can further be provided.

Figure 2:
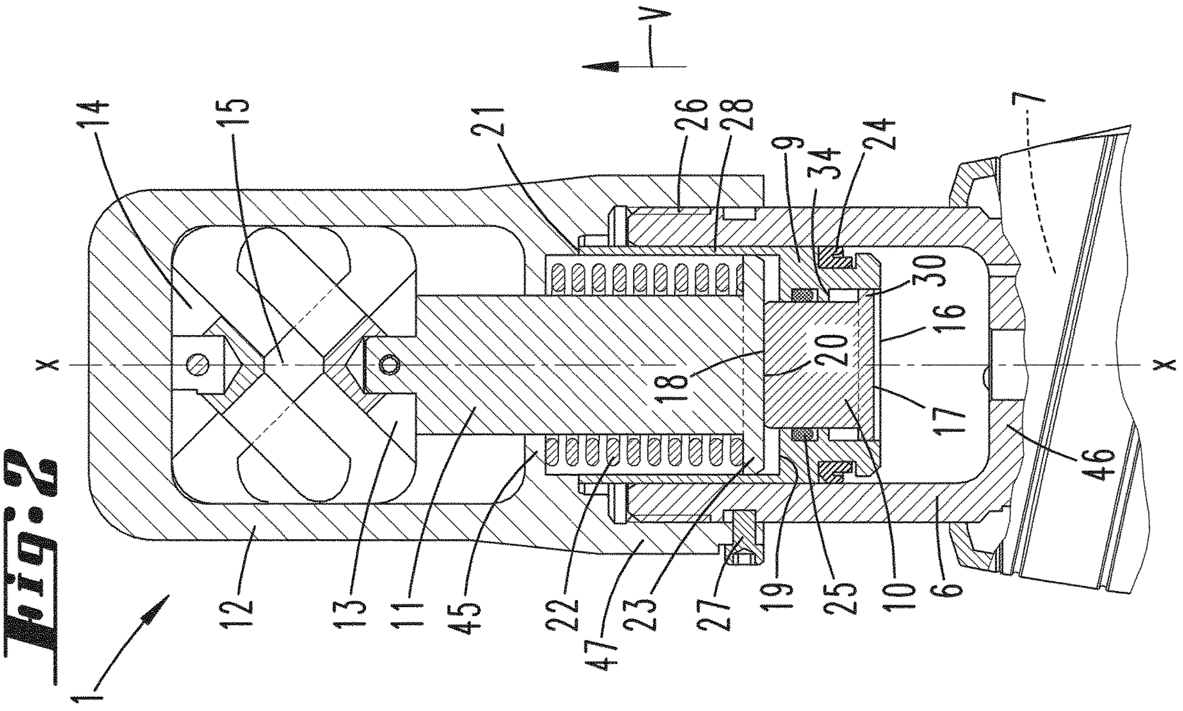
FIG. 2 is an illustration according to FIG. 1 after applying hydraulic pressure and moving the first partial body into a stop position.
Figure 1:
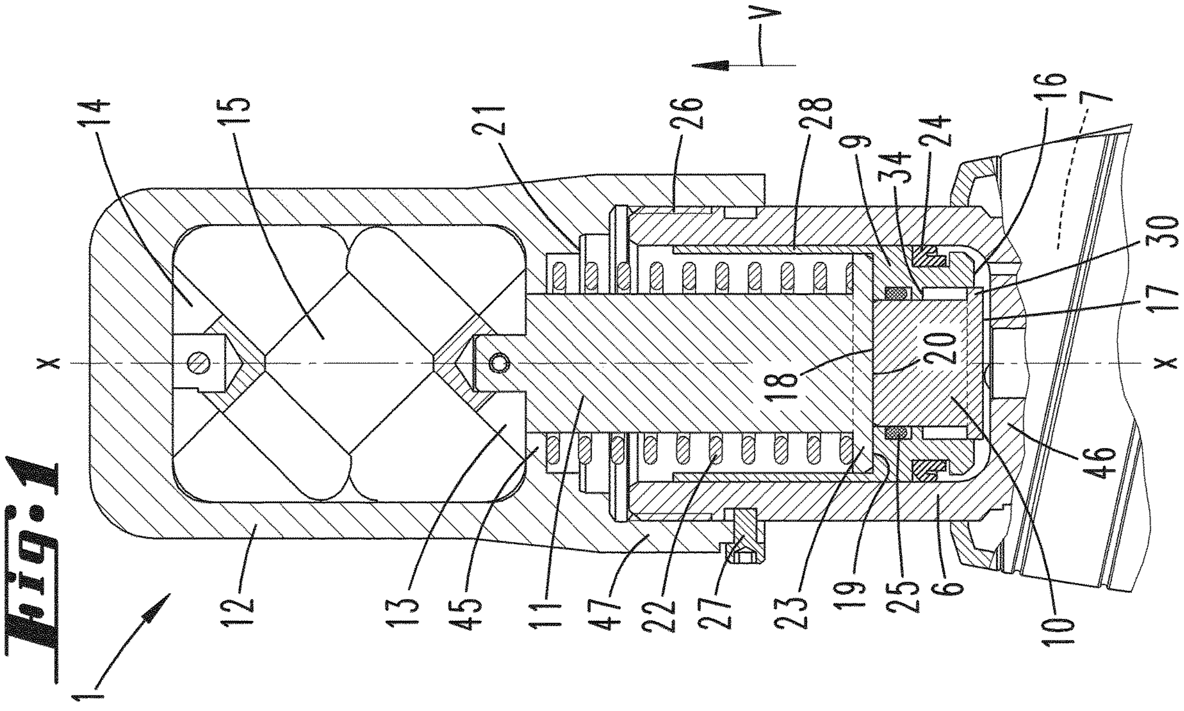
FIG. 1 is a cross section through a hydraulic cylinder and a working head of a working device with partially depicted hull device, in an initial position, with two partial pistons arranged concentrically to each other.
Figure 3:
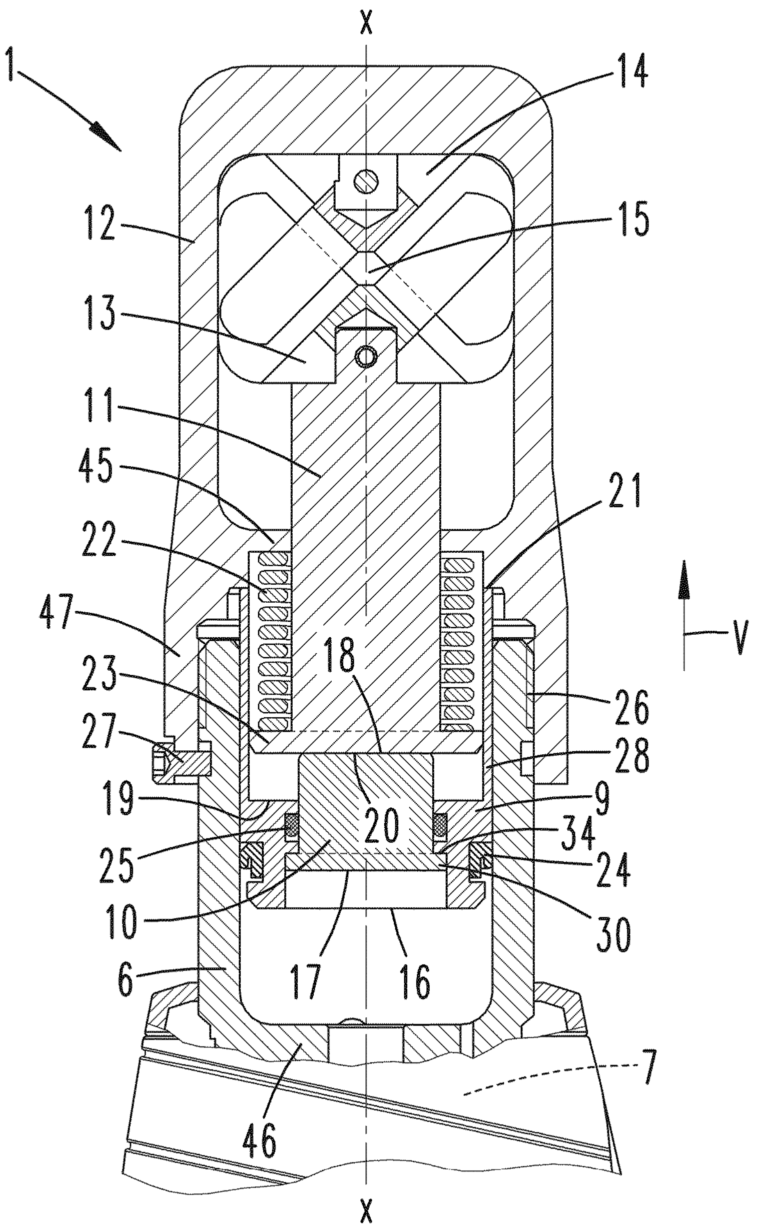
FIG. 3 is an illustration according to FIG. 1 or FIG. 2, after further moving the second partial piston as compared to FIG. 2.

As evident with further reference to FIGS. 1 to 3, a first partial piston 9 and a second partial piston 10 are arranged in the hydraulic cylinder 6 in a first embodiment. The second partial piston 10 is arranged inside of the first partial piston 9. As shown in FIGS. 1 and 2, the first and second partial pistons 9, 10 move relative to the hydraulic cylinder 6 in a traversing direction V. The first and second partial pistons 9, 10 are shown in a first position relative to the hydraulic cylinder 6 in FIG. 1 and are shown in a second position relative to the hydraulic cylinder 6 in FIG. 2. As also shown in FIGS. 1 and 2, the first and second partial pistons 9, 10 telescope into each other. The first and second partial pistons 9, 10 are shown in a first position relative to each other in FIG. 1 and are shown in a second position relative to each other in FIG. 2. Each partial piston 9, 10 has a geometric central axis that extends in the traversing direction. The geometric central axes of the partial piston 9, 10 coincide.

Further provided is a piston rod 11, which can be acted upon by the partial pistons 9, 10.

The piston rod 11 acts upon a tool 13 movably guided in a working head 12. In the exemplary embodiment, the tool 13 is preferably detachably connected with the piston rod 11.

In the exemplary embodiment, a movably guided first tool 13 and a second tool 14 are preferably fixedly arranged in the working head 12.

The exemplary embodiment involves a crimping device, preferably for crimping wire end ferrules. A crimping opening 15 is here left between the tools 13 and 14, which is diminished as the piston rod 11 increasingly travels, see FIGS. 2 and 3 proceeding from FIG. 1.

The two partial pistons, the first partial piston 9 and the second partial piston 10 each have a first impact surface 16 for acting upon the first partial piston 9 with hydraulic fluid, and a second impact surface 17 for acting upon the second partial piston 10 with hydraulic fluid. During the course of an operation, these impact surfaces 16 and 17 can be acted upon by the hydraulic means (not shown in detail) that are pumped into a hydraulic chamber provided between a lower portion of the hydraulic cylinder 6 and the lower ends of the partial pistons 9 and 10 for performing an operation. During the course of the operation as shown FIGS. 1 and 2, the hydraulic chamber is a first size when both partial pistons 9 and 10 act on the piston 16 in a first condition as shown in FIG. 1, and is the hydraulic chamber is a second, larger size when only partial piston 10 acts on the piston 16 in a second condition as shown in FIG. 2.

The two partial pistons, the first partial piston 9 and the second partial piston 10 act upon the same tool 13 by way of the piston rod 11.

During the performance of an operation of the kind depicted on FIGS. 2 and 3 proceeding from FIG. 1, the hydraulic fluid acts upon the first partial piston 9 and the second partial piston 10 with the same respective hydraulic pressure over the entire operation. This correspondingly happens even if the second partial piston 10 is not moved any further as the result of having reached a stop.

The piston rod 11 has an overall impact surface 18, by way of which both partial pistons 9, 10 can act upon the piston rod 11.

As evident from a comparison of the state on FIG. 3 to FIG. 2, the overall impact surface 18 of the piston rod 11 can be acted upon only by the second partial piston 10 while performing an operation; it is then detached from the first partial piston 9 and located a distance above it. The here annular partial impact surface located a distance away from the first partial piston is supplemented by the additional, here circular partial impact surface, which is acted upon by the second partial piston, to form the overall impact surface. On their part, the partial pistons 9, 10 each have a first or a second transfer surface 19, 20, with which they can act upon the respective partial impact surface of the overall impact surface 18 of the piston rod 11. Therefore, the partial impact surface of the overall impact surface 18 acted upon by the first partial piston 9 does not overlap the partial impact surface of the overall impact surface 18 acted upon by the second partial piston 10 in the traversing direction and in a direction transverse to the traversing direction.

As shown in the exemplary embodiment, the overall impact surface 18 of the piston rod 11 is preferably formed as a uniformly flat surface, which also extends essentially perpendicular to a traversing direction V of the piston rod 11 during an operation. Nonetheless, only a partial area of the impact surface 18 is always acted upon by the transfer surface 19 or 20 of the first or second partial piston 9, 10.

The first partial piston 9 is further preferably designed with a stop part. In the exemplary embodiment and as further preferred, the stop part is designed as a sleeve part 23. The sleeve part 28 can be integrally designed with the first partial piston 9. However, it can also be designed separately from the first partial piston 9, or integrally with the working head 12.

During the movement of the first partial piston 9, see the position on FIGS. 2 and 3, the sleeve part 28 obviously arrives at a stop 21, which is formed in the working head 12. Nevertheless, the first partial piston 9 can then not proceed any farther at a further elevated hydraulic pressure.

As preferred in this exemplary embodiment, but also further preferred in all exemplary embodiments, only a single return spring 22 is provided. The return spring 22 acts between the working head 12 and the piston rod 11. The return spring 22 preferably acts upon an impact flange 23 of the piston rod 11. Even opposite a side upon which the return spring 22 acts, the impact flange 23 preferably forms a part of the impact surface 18 for the first or second partial pistons 9, 10. As further preferred, both in this exemplary embodiment and further in all exemplary embodiments, the return spring 22 is arranged in an annular space between the sleeve part 28 and an outer surface of the piston rod 11.

The return spring 22 is further supported at the top against a cylinder cover 45.

The working head 12 is preferably formed so as to include a part of the hydraulic cylinder, here the cylinder cover 45 and a partial cylinder wall 47 that extends from the cylinder cover 45 in the direction toward a cylinder floor 46. The inside of the partial cylinder wall 47 can comprise part of the threaded connection 26.

The first partial piston 9 further preferably has a first gasket 24, with which it is sealed against an inner surface of the hydraulic cylinder 6. The first partial piston 9 further preferably has a second gasket 25, with which it forms a seal relative to the second partial piston 10.

The working head 12 is further preferably designed so that it can be detached from the hydraulic cylinder 6. In this exemplary embodiment and preferably in all exemplary embodiments, a threaded connection 26 is provided between the working head 12 and the hydraulic cylinder 6. A locking screw 27 can be used to fix the working head 12 in a screwed on position of the kind corresponding to FIGS. 1 to 3.

The impact flange 23 of the piston rod 11 further preferably moves inside of the sleeve part 23. An outer surface thereof here preferably borders an inner surface of the sleeve part 28.

The second partial piston 10 has a stop flange 30, with which it comes to a stop against an allocated stop 34 of the first partial piston when in the extended position, see FIG. 3. Since in the exemplary embodiment the gasket is obviously arranged after the stop 34 only in the traversing direction V, the stop 34 or related surface in this respect must still include the hydraulic impact surface of the first partial piston 9, and the stop flange 30 in this respect is no effective hydraulic part of the impact surface of the second partial piston 10.

Figure 6:
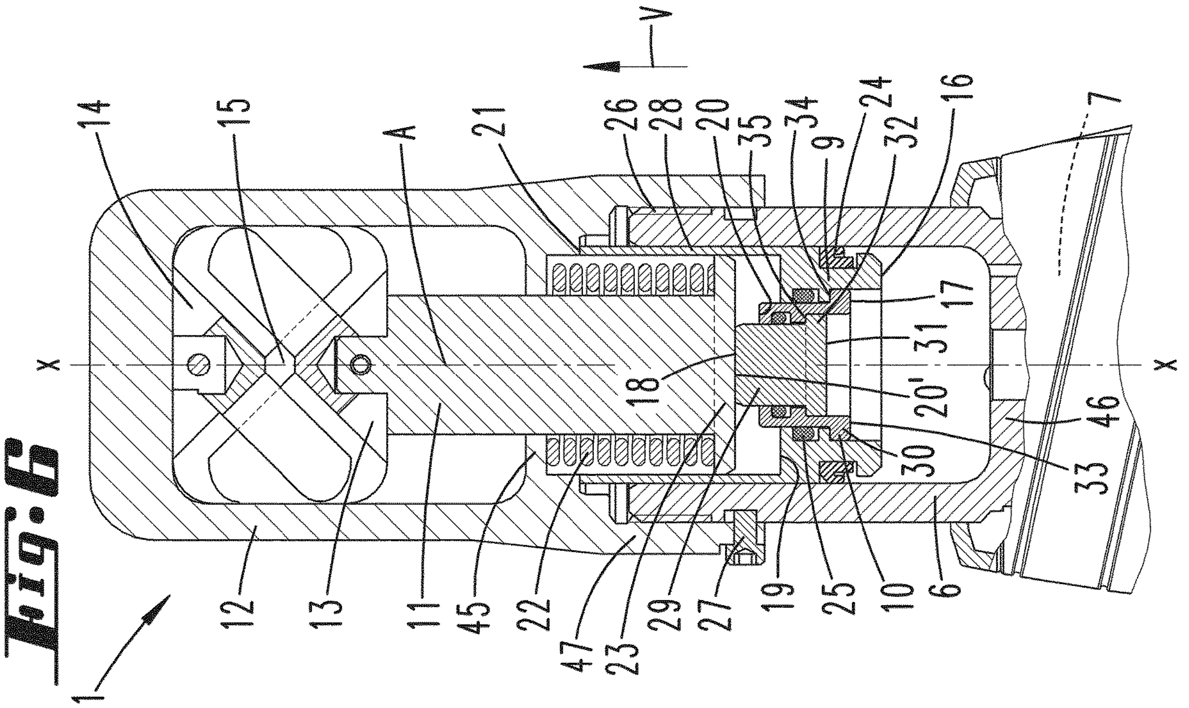
FIG. 6 is the arrangement according to FIG. 5 at the end of an operation.
Figure 5:
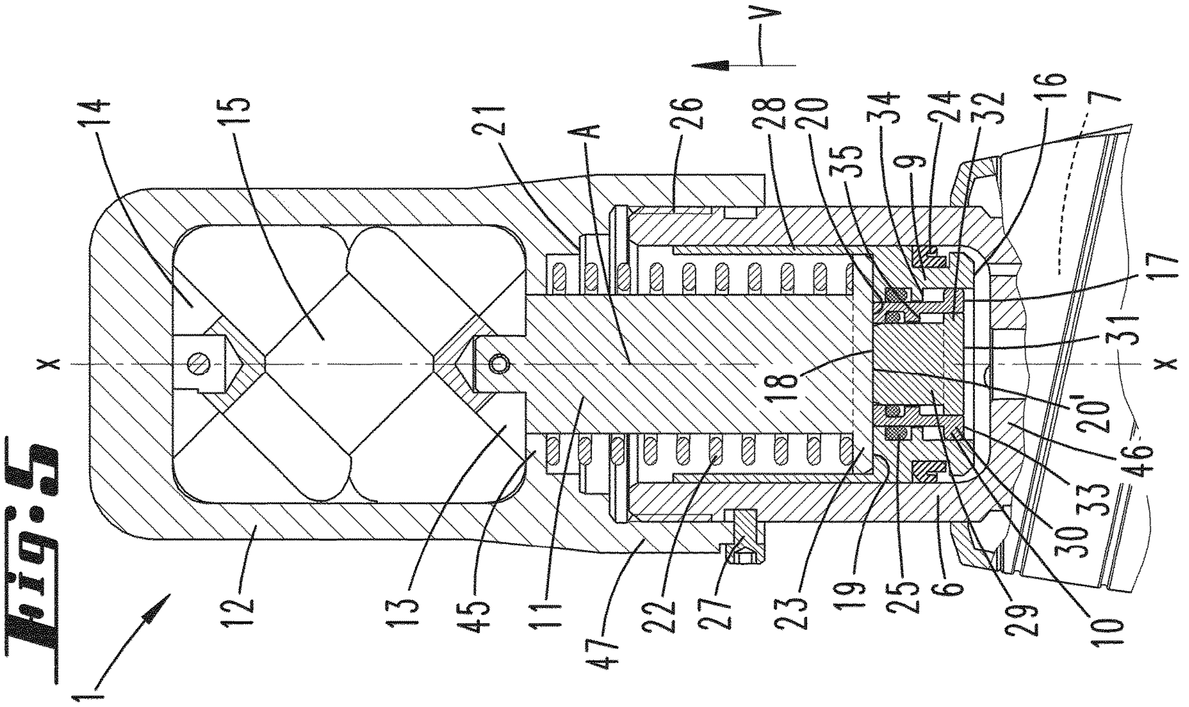
FIG. 5 is a cross section according to FIG. 1, given an arrangement with three partial pistons, at the beginning of an operation.

In the embodiment on FIGS. 5 and 6, a third partial piston 29 is provided in addition to the first partial piston 9 and the second partial piston 10, proceeding from the embodiment on FIGS. 1 to 3. All three partial pistons have coinciding geometric central axes A.

The second partial piston 10 is here designed as a sleeve part, which preferably guides the third partial piston 29 on its inner surface, and is guided in the first partial piston 9 on its outer surface. The first 9 and the second partial piston 10 correspondingly have an annular impact surface, while the third partial piston 29 has a circular impact surface.

All three partial pistons 9, 10, 29 telescope into each other. The third partial piston 29 is designed as a cylindrical partial piston with a stop flange 30 corresponding to the stop flange 30 of the second partial piston 10 in the first embodiment. As also the case in the first embodiment, the stop flange 32 together with the central area of the third partial piston 29 further forms a shared circular surface on the bottom side, which if hydraulically effective is an impact surface 31.

In a comparable manner, the second partial. piston 10 of this embodiment has a flange 30, which on the bottom side correspondingly adjoins the circular impact surface 33.

In the extended position at the end of an operation as shown on FIG. 6, just the third partial piston 29 acts upon a partial impact surface of the overall impact surface 18 of the piston rod 11 corresponding to its transfer surface 20'. The second partial piston 10 and/or the third partial piston 29 can each abut a stop 34 or 35 of the first piston 9 or the second piston 10.

Otherwise, the description of the first embodiment also applies, unless any specifics were addressed here.

Figure 8:
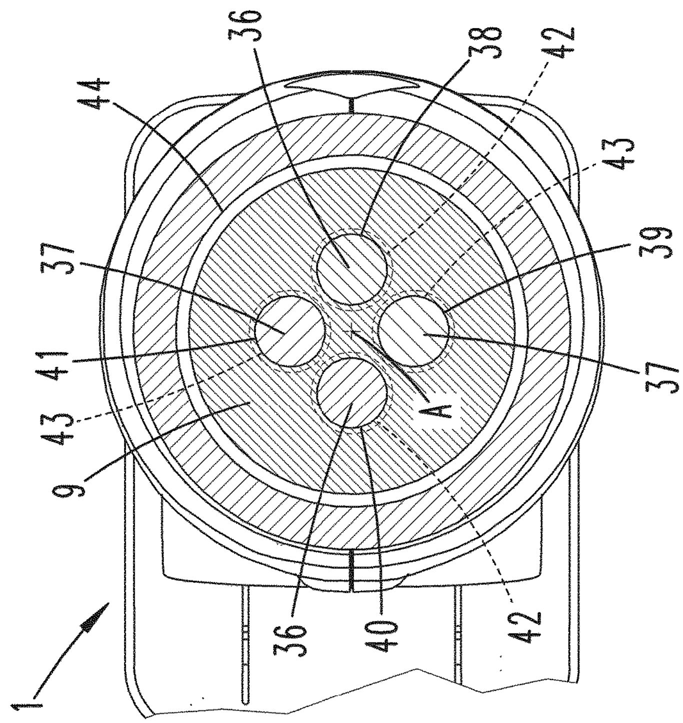
FIG. 8 is a cross section through the arrangement according to FIG. 7, cut along line VIII-VIII on FIG. 7.
Figure 7:
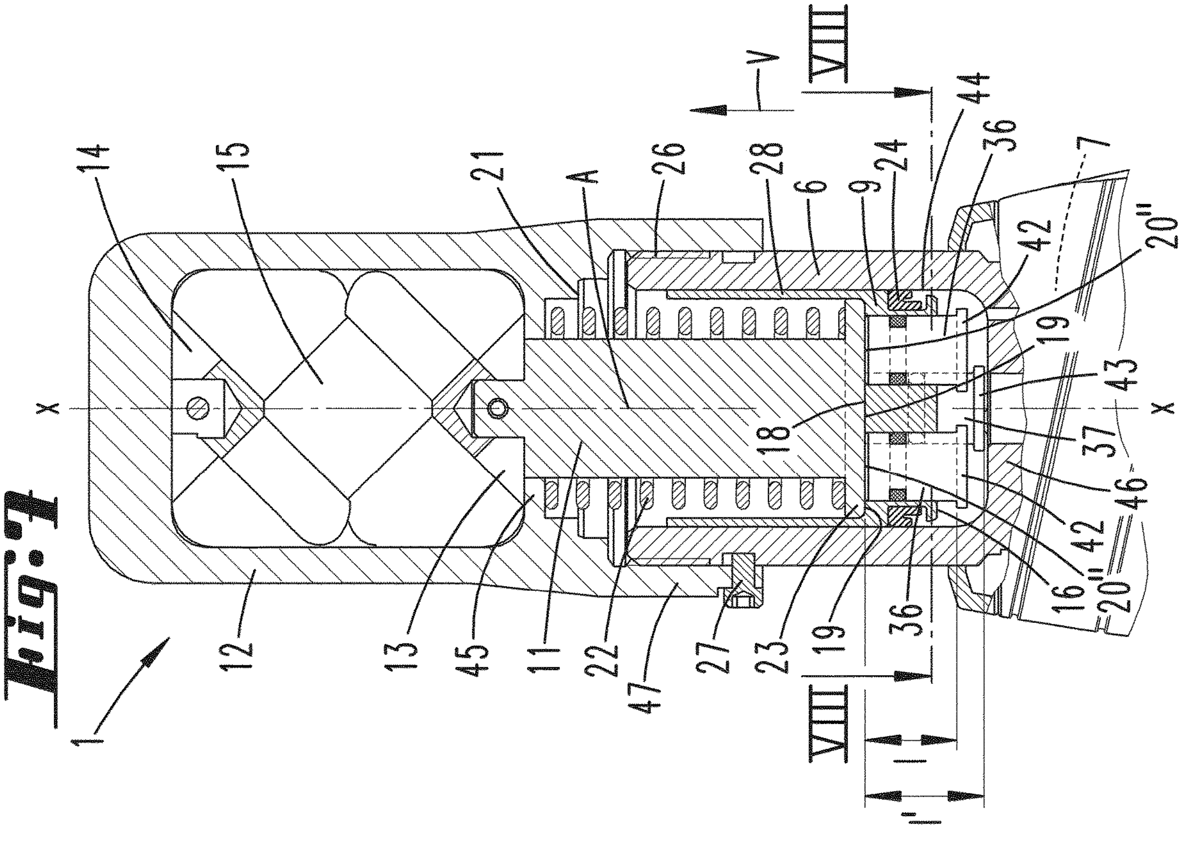
FIG. 7 is a cross section according to FIG. 1, in an arrangement with two pairs of identical partial pistons, arranged eccentrically in relation to a central axis.
Figure 9:
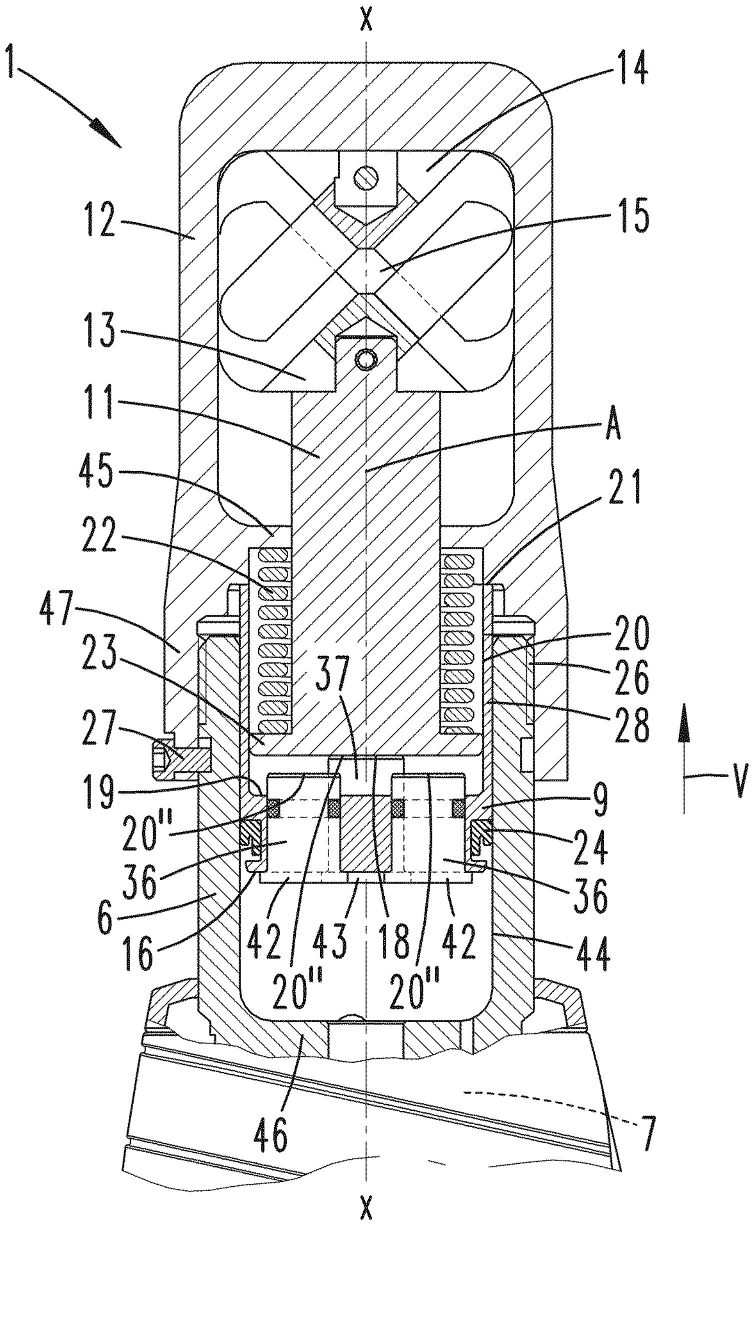
FIG. 9 is the arrangement according to FIG. 7 at the end of an operation.

The additional embodiment according to FIGS. 7 to 9 has second partial pistons 36 and third partial pistons 37 (see FIG. 8), which in the exemplary embodiment and preferably are formed in pairs. The second partial pistons 36 and third partial pistons 37 here each preferably have a matching length 1 or 1' in relation to the traversing direction V. The second partial pistons 36 or the third partial pistons 37 are each accommodated in a bore-like receiving opening 38, 39, 40, 41 of the first partial piston 9. The second partial pistons 36 are here provided in pairs, and have a shorter length 1 than the third partial pistons, which have the larger length 1'. As shown in FIG. 8, a geometric central axis of each second partial piston 36 is eccentric to the geometric central axis A of the first partial piston 9, and a geometric central axis of each third partial piston 37 is eccentric to the geometric central axis A of the first partial piston 9.

Even if the second and third partial pistons 36 or 37 are each shown with the same diameter in terms of their paired configuration, but also each viewed separately, they can also have varying diameters.

As shown, the second partial pistons 36 and the third partial pistons 37 in this embodiment each preferably have a flange 42, 43 on the bottom side, with which they can also come to abut against a corresponding surface of the partial piston in an extended position. In this embodiment as well, the flanges 42, 43 are hydraulically not included in the impact surfaces.

The transfer surfaces of the second and third partial pistons 36, 37 have uniformly the reference number 20".

An outer edge 44 of the impact surface of the first partial piston 9 in this exemplary embodiment is provided so as to coincide with an inner surface of the hydraulic cylinder. With respect to the geometric central axis A, the impact surfaces of the second and third partial pistons 36, 37 are not to be included, wherein no difference would arise here either owing to the symmetrical arrangement.

All disclosed features (whether taken separately or in combination with each other) are essential to the invention. The disclosure of the application hereby also incorporates the disclosure content of the accompanying/attached priority documents (copy of the prior application) in its entirety, also for the purpose of including features of these documents in claims of the present application. Even without the features of a referenced claim, the subclaims characterize standalone inventive further developments of prior art with their features, in particular so as to submit partial applications based upon these claims. The invention indicated in each claim can additionally have one or several of the features indicated in the above description, in particular those provided with reference numbers and/or indicated on the reference list. The invention also relates to design forms in which individual features specified in the above description are not realized, in particular if they are recognizably superfluous with regard to the respective intended use, or can be replaced by other technically equivalent means.

REFERENCE LIST

| | |
|---|---|
| 1 | Working device |
| 2 | Accumulator |
| 3 | Motor |
| 4 | Gearbox |
| 5 | Pump |
| 6 | Hydraulic cylinder |
| 7 | Storage space |
| 3 | Activating switch |
| 9 | First partial piston |
| 10 | Second partial piston |
| 11 | Piston rod |
| 12 | Working head |
| 13 | First tool |
| 14 | Second tool |
| 15 | Crimping opening |
| 16 | First impact surface |
| 17 | Second impact surface |
| 18 | Overall impact surface |
| 19 | Transfer surface |
| 20 | Transfer surface |
| 20' | Transfer surface |
| 20" | Transfer surface |
| 21 | Stop |
| 22 | Return spring |
| 23 | Impact flange |
| 24 | First gasket |
| 25 | Second gasket |
| 26 | Threaded connection |
| 27 | Locking screw |
| 28 | Sleeve part |
| 29 | Third partial piston |
| 30 | Stop flange |
| 31 | Impact surface |
| 32 | Flange |
| 33 | Circular impact surface |
| 34 | Stop |
| 35 | Stop |
| 36 | Second partial piston |
| 37 | Third partial piston |
| 38 | Bore-like receiving opening |
| 39 | Bore-like receiving opening |
| 40 | Bore-like receiving opening |
| 41 | Bore-like receiving opening |
| 42 | Flange |
| 43 | Flange |
| 44 | Outer edge |
| 45 | Cylinder cover |
| 46 | Cylinder floor |
| 47 | Partial cylinder wall |
| l | Length |
| l' | Length |
| A | Central azis |
| V | Traversing direction |

The invention claimed is:

1. A hydraulically activatable working device for performing a working operation, comprising:

a hydraulic cylinder;

a first partial piston within the hydraulic cylinder and movable relative thereto, the first partial piston having a first impact surface at a lower end thereof and a first transfer surface at an upper end thereof;

a second partial piston within the hydraulic cylinder, the second partial piston being movable relative to the hydraulic cylinder and movable relative to the first partial piston, the second partial piston having a second impact surface at a lower end thereof and a second transfer surface at an upper end thereof;

a hydraulic chamber provided between the hydraulic cylinder and the lower ends of the first and second partial pistons, the hydraulic chamber configured to receive a hydraulic fluid therein, wherein the hydraulic fluid acts against the first and second impact surfaces upon pressurization of the hydraulic fluid in the hydraulic chamber to cause the first partial piston to move relative to the hydraulic cylinder in a traversing direction for performing the working operation and to cause the second partial piston to move relative to the hydraulic cylinder and relative to the first partial piston in the traversing direction for performing the working operation, wherein the hydraulic fluid acts on the first and second impact surfaces at the same hydraulic pressure;

a piston rod within the hydraulic cylinder which is a separate component from the first and second partial pistons, the piston rod having an impact surface at a lower end thereof which forms a first partial impact surface against which the first transfer surface acts and a second partial impact surface against which the second transfer surface acts, wherein the first and second partial impact surfaces do not overlap each other in the traversing direction and do not overlap each other in a direction transverse to the traversing direction, wherein the first and second transfer surfaces are engaged against the first and second partial impact surfaces of the piston rod in a first condition during the working operation, and wherein only the second transfer surface is engaged against the second partial impact surface of the piston rod in a second condition during the working operation;

a tool coupled to the piston rod and movable therewith; and a return spring within the hydraulic cylinder, the return spring biasing the first and second partial pistons in a direction opposite to the traversing direction, wherein the first and second partial pistons are movable in the traversing direction against the bias of the return spring.

2. The hydraulically activatable working device claim 1, wherein the return spring is positioned between the hydraulic cylinder and the piston rod.

3. The hydraulically activatable working device according claim 1, wherein the piston rod includes an impact flange at the lower end thereof, and the return spring acts against the impact flange.

4. The hydraulically activatable working device according to claim 3, wherein the first partial piston includes a sleeve part, and the impact flange of the piston rod is within the sleeve part.

5. The hydraulically activatable working device according to claim 1, wherein the second partial piston is seated within a passageway of the first partial piston, and further comprising a first gasket which seals the first partial piston against an inner surface of the hydraulic cylinder and a second gasket which seals the second partial piston against an inner surface of the first partial piston.

6. The hydraulically activatable working device according to claim 1, wherein each of the first and second partial pistons has a geometric central axis extending in the traversing direction, and wherein the geometrical central axes coincide.

7. The hydraulically activatable working device according to claim 1, wherein each of the first and second partial pistons has a geometric central axis extending in the traversing direction, wherein the geometric central axes of the first and second partial pistons are spaced apart from each other.

8. The hydraulically activatable working device according to claim 1, further comprising a pair of second partial pistons are arranged in respective through openings of the first partial piston.

9. The hydraulically activatable working device according to claim 8, wherein each of the first and second partial pistons has a geometric central axis extending in the traversing direction, and wherein the second partial pistons are arranged eccentrically to the geometric central axis of the first partial piston.

10. The hydraulically activatable working device according to claim 1, wherein the first and second partial impact surfaces are always positioned inside the hydraulic cylinder during the working operation.

11. The hydraulically activatable working device according to claim 1, wherein the second partial piston is seated within a passageway of the first partial piston, and the first and second partial pistons are configured to telescope relative to each other.

12. A hydraulically activatable working device for performing a working operation, comprising a hydraulic cylinder;

a first partial piston within the hydraulic cylinder and movable relative thereto, the first partial piston having a first impact surface at a lower end thereof and a first transfer surface at an upper end thereof;

a second partial piston seated within a passageway of the first partial piston, the second partial piston having a second impact surface at a lower end thereof and a second transfer surface at an upper end thereof;

a third partial piston seated within a passageway of the second partial piston, the third partial piston having a third impact surface at a lower end thereof and a third transfer surface at an upper end thereof, and wherein the first, second and third partial pistons are configured to telescope relative to each other such that the partial pistons are movable relative to each other and movable relative to the hydraulic cylinder;

a hydraulic chamber provided between the hydraulic cylinder and the lower ends of the first, second and third partial pistons, the hydraulic chamber configured to receive a hydraulic fluid therein, wherein the hydraulic fluid acts against the first, second and third impact surfaces upon pressurization of the hydraulic fluid in the hydraulic chamber to cause the first, second and third partial pistons to move relative to the hydraulic cylinder in a traversing direction during the working operation;

a piston rod within the hydraulic cylinder which is a separate component from the first, second and third partial pistons, the piston rod having an impact surface at a lower end thereof which forms a first partial impact surface against which the first transfer surface acts, a second partial impact surface against which the second transfer surface acts, and a third partial impact surface against which the third transfer surface acts, wherein the first, second and third transfer surfaces are engaged against the first, second and third partial impact surfaces of the piston rod in a first condition during the working operation, wherein only the second and third transfer surfaces are engaged against the second and third partial impact surfaces of the piston rod in a second condition during the working operation, and wherein only the third transfer surface is engaged against the third partial impact surface of the piston rod in a third condition during the working operation, and wherein the hydraulic fluid acts on the first, second and third impact surfaces at the same hydraulic pressure;

a tool coupled to the piston rod and movable therewith; and a return spring within the hydraulic cylinder, the return spring biasing the first, second and third partial pistons in a direction opposite to the traversing direction, wherein the first, second and third partial pistons are movable in the traversing direction against the bias of the return spring.

13. The hydraulically activatable working device according to claim 1, wherein a pair of the second partial pistons are provided and each second partial piston is seated within a respective passageway of the first partial piston, and wherein the impact surface of the piston rod has a pair of the second partial impact surfaces against which the respective second transfer surfaces act, wherein the first transfer surface and the pair of second transfer surfaces are engaged against the first and second partial impact surfaces of the piston rod in the first condition, and wherein only the second transfer surfaces are engaged against the second partial impact surfaces of the piston rod in the second condition.

14. The hydraulically activatable working device according to claim 13, wherein the second partial pistons are configured to telescope relative to the first partial piston.

15. The hydraulically activatable working device according to claim 13, further comprising a pair of third partial pistons seated within respective passageways of the first partial piston, each third partial piston having a third impact surface at a lower end thereof and a third transfer surface at an upper end thereof, wherein the third partial pistons are configured to telescope relative to the first partial piston such that the first and third partial pistons are movable relative to each other and movable relative to the hydraulic cylinder;

wherein the hydraulic fluid acts further against the third impact surfaces upon pressurization of the hydraulic fluid in the hydraulic chamber to cause the third partial pistons to move relative to the hydraulic cylinder in the traversing direction for performing the working operation; and wherein the piston rod is a separate component from the third partial pistons, the impact surface of the piston rod further having third partial impact surfaces against which the respective third transfer surfaces act, wherein the third transfer surfaces are engaged against the third partial impact surfaces of the piston rod in the first condition, wherein the third transfer surfaces are engaged against the third partial impact surfaces of the piston rod in the second condition, and wherein only the third transfer surfaces are engaged against the third partial impact surfaces of the piston rod in a third condition during the working operation, and wherein the hydraulic fluid acts on the first, second and third impact surfaces at the same hydraulic pressure, and wherein the return spring is further configured to bias the third partial pistons in the direction opposite to the traversing direction, and wherein further the third partial pistons are movable in the traversing direction against the bias of the return spring.

16. The hydraulically activatable working device according to claim 15, wherein each second partial piston has a length, and each third partial piston has a length, wherein the lengths of the second partial pistons are less than the lengths of the third partial pistons.

17. The hydraulically activatable working device according to claim 1, wherein the impact surface is flat.

18. The hydraulically activatable working device according to claim 12, wherein the impact surface is flat.

19. The hydraulically activatable working device according to claim 15, wherein the impact surface is flat.

20. A hydraulically activatable working device for performing a working operation, comprising:

a hydraulic cylinder;

a first partial piston within the hydraulic cylinder and movable relative thereto, the first partial piston having a first impact surface at a lower end thereof and a first transfer surface at an upper end thereof;

a second partial piston within the hydraulic cylinder, the second partial piston being movable relative to the hydraulic cylinder and movable relative to the first partial piston, the second partial piston having a second impact surface at a lower end thereof and a second transfer surface at an upper end thereof;

a hydraulic chamber provided between the hydraulic cylinder and the lower ends of the first and second partial pistons, the hydraulic chamber configured to receive a hydraulic fluid therein, wherein the hydraulic fluid acts against the first and second impact surfaces upon pressurization of the hydraulic fluid in the hydraulic chamber to cause the first partial piston to move relative to the hydraulic cylinder in a traversing direction for performing the working operation and to cause the second partial piston to move relative to the hydraulic cylinder and relative to the first partial piston in the traversing direction for performing the working operation, wherein the hydraulic fluid acts on the first and second impact surfaces at the same hydraulic pressure;

a piston rod within the hydraulic cylinder which is a separate component from the first and second partial pistons, the piston rod having an impact surface at a lower end thereof which forms a first partial impact surface against which the first transfer surface acts and a second partial impact surface against which the second transfer surface acts, wherein the first and second transfer surfaces are engaged against the impact surface of the piston rod in a first condition during the working operation, and wherein the second partial piston extends upward from the first transfer surface such that only the second transfer surface is engaged against the impact surface of the piston rod in a second condition during the working operation;

a tool coupled to the piston rod and movable therewith; and a return spring within the hydraulic cylinder, the return spring biasing the first and second partial pistons in a direction opposite to the traversing direction, wherein the first and second partial pistons are movable in the traversing direction against the bias of the return spring.

21. The hydraulically activatable working device according to claim 20, wherein the impact surface is flat.

* * * * *